UNITED STATES PATENT OFFICE.

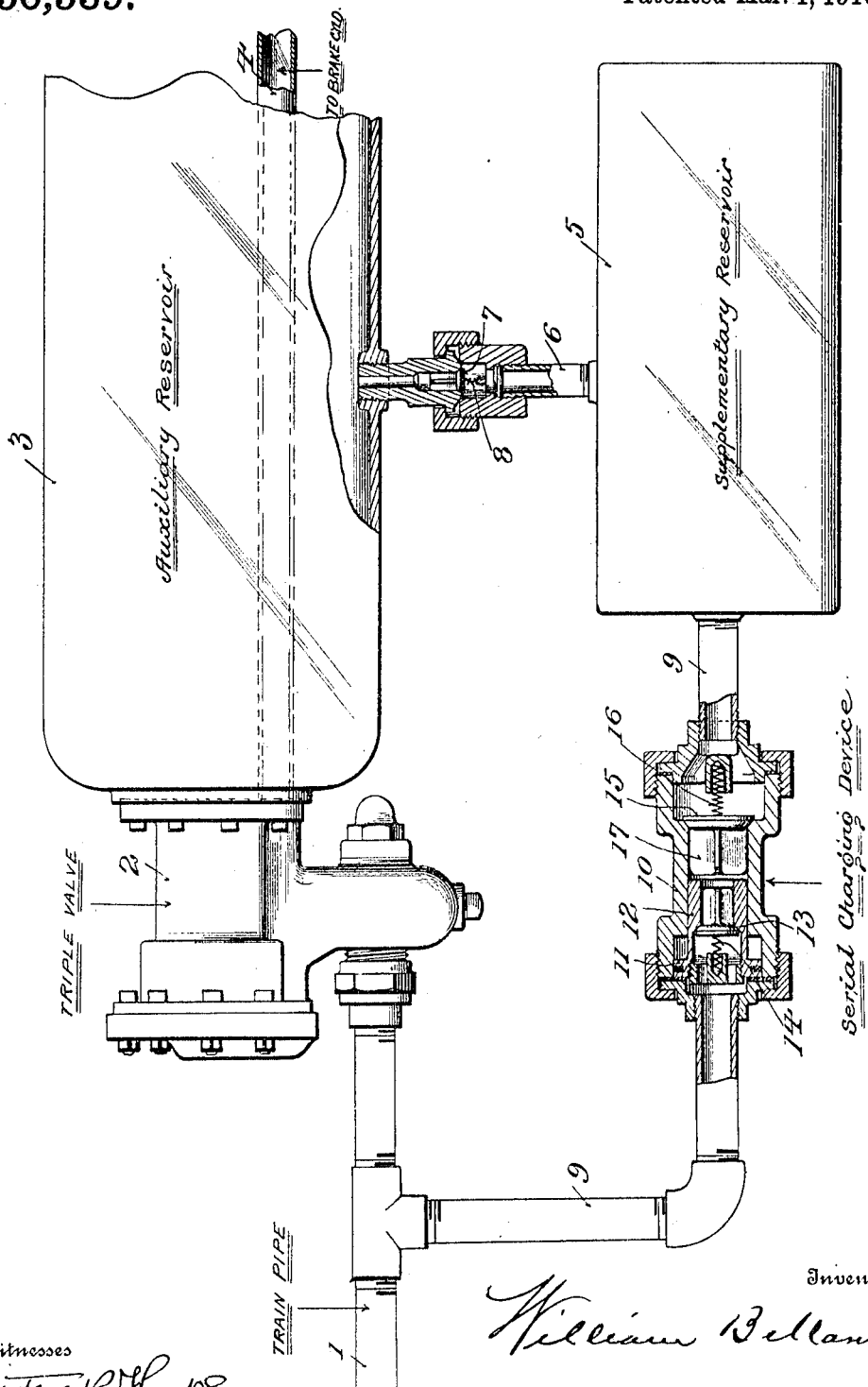

WILLIAM B. MANN, OF BALTIMORE, MARYLAND, ASSIGNOR TO PHILIP MAURO AND S. T. CAMERON, TRUSTEES, BOTH OF WASHINGTON, DISTRICT OF COLUMBIA.

AIR-BRAKE.

950,539.  Specification of Letters Patent.  Patented Mar. 1, 1910.

Application filed April 28, 1908. Serial No. 429,731.

*To all whom it may concern:*

Be it known that I, WILLIAM B. MANN, of Baltimore, Maryland, have invented a new and useful Improvement in Air-Brakes, which invention is fully set forth in the following specification.

This invention relates to air-brakes, and has for its object to secure the prompt release of the brakes after emergency or service applications. As is well-known in this art, the release of the brakes in all standard systems now in regular use upon railroads is secured by increasing the train-pipe pressure by admitting compressed air from the main reservoir on the engine to the train-pipe through the engineer's valve. In the long trains now frequently in use there is a very considerable period of time consumed in the travel of the pressure from the front to the rear of the train, with the result that the brakes on the forward part of the train are released much in advance of those on the rear portion of the train. This slow travel of the releasing pressure to the rear part of the train is not only due to the distance from the front to the rear of the train, but is also due to the further fact that more or less air is taken from the train-pipe for the re-charging of the auxiliary reservoirs. In practical railroad operations there are many undesirable results of this retarded release of the brakes on the rear cars of the train, and, since they are well-known to men familiar with this art, need not here be specifically enumerated.

The object of the present invention is to provide means whereby the releasing pressure applied to the pistons of the several triple-valves on the cars of the train shall occur serially, but with such extreme rapidity that the releasing action shall be felt upon the rear car of the train almost immediately after it is felt upon the forward car, to the end that the brakes shall be nearly simultaneously released throughout the length of the entire train.

With this object in view, the invention consists in means for serially introducing increased pressure into the train-pipe throughout the length of the train, the pressure from the main reservoir on the engine merely serving to initiate the action. To secure this result, I provide in addition to the ordinary auxiliary reservoir an additional series of supplementary reservoirs, preferably, though not necessarily, one on each car of the train. These supplementary reservoirs are charged from the train-pipe, preferably simultaneously with the charging of the auxiliary reservoirs, and preferably, though not necessarily, with substantially the same pressure as that existing in the auxiliary reservoirs and in the train-pipe under ordinary running conditions.

Interposed between the supplementary reservoir and the train-pipe I provide mechanism which, when the brakes are applied, prevents passage of supplementary reservoir pressure into the train-pipe, but upon an increase of train-pipe pressure after the application of the brakes and for the purpose of releasing the brakes, opens a passage from the supplementary reservoir to the train-pipe. By this means, the instant that increased train-pipe pressure is introduced into the said pipe through the engineer's valve, said increased pressure operates to open a passage from the supplementary reservoir to the train-pipe, and this, by augmenting the train-pipe pressure, causes said pressure to be quickly felt on the next succeeding car, which in turn operates mechanism to throw the next supplementary reservoir into communication with the train-pipe, and thus the several supplementary reservoirs throughout the train are serially brought into rapid communication with the train-pipe without the necessity of awaiting the time which would be consumed for the increasing releasing pressure to travel from the engine to the rear of the train, as in constructions now in use. By this means I serially increase the train-pipe or brake-releasing pressure throughout the train, and secure the same increase in the rapidity of the release that is secured by serially venting the train-pipe for rapid emergency applications of the brakes in the standard valves now in use.

The mechanism for thus opening communication between the supplementary reservoir and the train-pipe to release the brakes may have a great variety of forms and may be either wholly independent of the triple-valve mechanism, or may form a part of said mechanism.

While, as above stated, the inventive idea is capable of receiving a variety of mechanical expressions, I have, for the purpose of illustrating the invention, shown one form thereof in the accompanying drawings, in which form the pressure from the supplementary reservoir is admitted to the train-pipe independent of the triple-valve; but it is to be expressly understood that the invention is not limited to this independent form, the invention being broader than the mere form chosen for illustration, and I therefore wish it expressly understood that the limits of the invention are to be defined by the claims herein, and not by the specific form of the invention chosen for illustration.

The accompanying drawing is a broken side elevation, with parts in section, illustrating my invention.

In said drawing, 1 is the train-pipe, 2 the triple-valve, 3 the auxiliary reservoir, and 4 the conduit leading from the auxiliary reservoir via the triple-valve to the brake-cylinder. All of these parts may be of the usual or any other desired construction.

The supplementary reservoir 5 is here shown as connected by a suitable conduit 6 with the auxiliary reservoir, and in said conduit there is introduced a valve 7 which can open against the tension of spring 8 to permit the passage of air from the auxiliary reservoir to the supplementary reservoir when the pressure in the auxiliary reservoir exceeds that in the supplementary reservoir, but, which, when the pressure in the auxiliary reservoir is lowered, as upon service or emergency applications of the brakes, promptly closes, thus preventing any passage of pressure from the supplementary reservoir to the auxiliary reservoir. In the form of the invention here shown, there is a by-pass in the form of a pipe 9 from the train-pipe to the supplementary reservoir around the triple-valve and the auxiliary reservoir, and there is introduced into the conduit or pipe 9 a valve casing 10, within which there plays a piston 11. This piston is exposed at all times to train-pipe pressure, and has a hollow stem 12, the passage through said hollow stem being closed by a valve 13 opening only toward train-pipe pressure and being normally held to its seat by a spring 14 in addition to the tension in the train-pipe. In the supplementary reservoir end of casing 10 there is a valve 15 opening only toward the supplementary reservoir and against the tension of a spring 16. The stem 17 of this valve 15 very nearly, but not quite, abuts the piston stem 12 when the parts are in their normal position shown in the drawings, that is, in running position with the normal pressure of say 70 pounds in the train-pipe, the auxiliary reservoir and the supplementary reservoir.

When the train-pipe pressure is reduced, for the purpose of applying the brakes, the auxiliary reservoir pressure is reduced by the passage of air from said reservoir to the brake-cylinder, the valve 7, however, preventing passage of pressure from the supplementary reservoir to the auxiliary reservoir, and the valve 15 preventing the passage of pressure from the supplementary reservoir to the train-pipe. This supplementary reservoir pressure is slightly below that of the normal train-pipe and auxiliary reservoir pressure, owing to the tension of the spring 8; that is, the combined supplementary reservoir pressure and the pressure of spring 8 together equal normal auxiliary reservoir pressure. The brakes having been applied, and it being desired to release the brakes, the engineer admits normal train-pipe pressure to the train-pipe, and this pressure acts to force the piston 11 from left to right, as seen in the drawing, and the hollow piston stem 12 abutting the valve stem 17 lifts the valve 15 from its seat, when pressure passes from the supplementary reservoir through the hollow piston stem 12, lifting the valve 13, and thence passes to the train-pipe, thereby serving to materially augment the pressure in the train-pipe. This results in a like action on the next succeeding supplementary reservoir, preferably under the next car, and this action occurs serially through the length of the train. It will be seen that by these means there is quickly and serially supplied to the train-pipe a large amount of increased air-pressure from the series of supplementary reservoirs upon the train, without the necessity of waiting for the travel of the main reservoir pressure from the engineer's valve through the length of the train-pipe, and that the releasing action on each car will be correspondingly quickened.

What is claimed is:—

1. In an air-brake system, the combination of a train-pipe, a triple-valve and an auxiliary reservoir, with a supplemental reservoir, means permitting the charging of the supplemental reservoir from the auxiliary reservoir, a by-pass from the train-pipe around the triple valve to the supplemental reservoir, and means admitting supplemental reservoir air by way of said by-pass to the train-pipe when the pressure in the latter is increased to release the brakes.

2. In an air-brake system, the combination of a train-pipe, a triple valve, and an auxiliary reservoir, with a supplemental reservoir, a passage-way between the auxiliary reservoir and supplemental reservoir, a valve in said passage-way opening only toward the supplemental reservoir, a by-pass from the train-pipe around the triple valve to the supplemental reservoir, and means admitting supplemental reservoir air to the train-pipe by way of said by-pass when the pressure in the latter is increased to release the brakes.

3. In an air-brake system, the combination of a train-pipe, a triple valve and an auxiliary reservoir, with a supplemental reservoir, means for charging said supplemental reservoir from the train-pipe, a by-pass from said supplemental reservoir to the train-pipe around the triple valve, and means admitting supplemental reservoir air to the train-pipe by way of said by-pass when the pressure in the train-pipe is increased to release the brakes.

4. In an air-brake system, the combination of the train-pipe, a triple valve, an auxiliary reservoir, and a supplemental reservoir, means for charging said supplemental reservoir from the train-pipe, a passage-way from the supplemental reservoir to the train-pipe independent of the triple valve, and a valve mechanism in said passage-way operated upon an increase of train-pipe pressure to admit air from the supplemental reservoir to the train-pipe.

In testimony whereof I have signed this specification in the presence of two subscribing witnesses.

WILLIAM B. MANN.

Witnesses:
JOHN B. McGRAW,
AUGUSTUS W. BRADFORD.